(12) United States Patent
Oustry

(10) Patent No.: US 6,721,693 B2
(45) Date of Patent: Apr. 13, 2004

(54) PROCESSING DEVICE COMPRISING A COVARIANCE MATRIX CORRECTION DEVICE

(75) Inventor: François Oustry, Grenoble (FR)

(73) Assignee: Raise Partner, Grenoble (FR)

(*) Notice: Subject to any disclaimer, the term of this patent is extended or adjusted under 35 U.S.C. 154(b) by 34 days.

(21) Appl. No.: 10/245,376

(22) Filed: Sep. 18, 2002

(65) Prior Publication Data

US 2003/0088386 A1 May 8, 2003

(30) Foreign Application Priority Data

Sep. 20, 2001 (FR) .............................. 01 12136

(51) Int. Cl.⁷ ................................................ G01S 7/36
(52) U.S. Cl. ...................... 702/196; 702/190; 702/191; 702/192; 702/193; 702/194; 702/189; 702/185
(58) Field of Search ........................... 702/27, 85, 185, 702/189, 190, 191, 192, 193, 194, 196; 342/80, 147, 148, 149, 152, 194, 195, 16, 90, 77, 417, 427, 373, 378; 706/22, 25

(56) References Cited

U.S. PATENT DOCUMENTS

| | | | | |
|---|---|---|---|---|
| 4,688,187 A | * | 8/1987 | McWhirter | 708/819 |
| 4,753,246 A | * | 6/1988 | Freeman | 600/544 |
| 5,568,400 A | * | 10/1996 | Stark et al. | 702/85 |
| 5,664,059 A | * | 9/1997 | Zhao | 704/254 |
| 5,798,942 A | * | 8/1998 | Danchick et al. | 342/96 |
| 6,498,581 B1 | * | 12/2002 | Yu | 342/90 |
| 6,658,234 B1 | * | 12/2003 | Dogan et al. | 342/373 |
| 6,658,287 B1 | * | 12/2003 | Litt et al. | 600/544 |
| 2002/0188423 A1 | * | 12/2002 | Gross et al. | 702/182 |
| 2003/0065535 A1 | * | 4/2003 | Karlov et al. | 705/2 |
| 2003/0085832 A1 | * | 5/2003 | Yu | 342/16 |

OTHER PUBLICATIONS

Chang et al., "Fast Eigenspace Decomposition of Correlated Images" IEEE Transactions on Image Processing, vol. 9, No. 11, Nov. 2000.*

Satio et al., "Operator Theoretical Analysis to Domain Decomposition Method" 12$^{th}$ International Conference on Domain Decomposition Methods.*

Soderkvist, I., "On Algorithms for Generalized Least Squares Problems with Ill–Conditioned Covariance Matrices," Computational Statistics, (1996) vol., 11, No. 3, pp. 303–313.

Nikiforuk, P. et al., "On Stochastic Perturbation Theory for Linear Systems," Proceedings of the IEEE 1969 Symposium on Adaptive Processes, Decision and Control, University Park, PA, USA, Nov. 17–19, 1969.

Hasslinger, H.L., "A General Perturbation Theory for Large Discrete Linear Dynamical Systems," Ingenieur–Archiv, 1987, West Germany, vol. 57, No. 1, pp. 61–72.

Ho, W.C. et al., "Perturbation Theory of Output Feedback Pole Assignment," International Journal of Control, Sep. 1988, UK, vol. 48, No. 3, pp. 1075–1088.

* cited by examiner

Primary Examiner—Marc S. Hoff
Assistant Examiner—Carol Tsai
(74) Attorney, Agent, or Firm—Oliff & Berridge, PLC

(57) ABSTRACT

The correction device comprises a block for decomposition into total proper elements, according to the Kato spectral decomposition method, of the covariance matrix to be corrected. The block supplies to a correction block the total proper values and the total projectors of the covariance matrix, as well as first coefficient vectors for the combination of the source signals of the covariance matrix. The correlation block estimates the reconstructed variances of combinations of the source signals using the first coefficient vectors and second used-defined coefficient vectors. It looks for the corrected matrix closest to the matrix to be corrected, in relation to the variances and total projectors while is applying a quasi-Newton type method to the dual of a semi-defined lesser error square programme.

7 Claims, 2 Drawing Sheets

PROCESSING DEVICE COMPRISING A COVARIANCE MATRIX CORRECTION DEVICE

TECHNICAL FIELD OF THE INVENTION

The invention concerns a processing device for a plurality of source digital signals, composed of measurement samples of the signals to be analysed, comprising a correction device for a covariance matrix, representative of the relations between the source signals.

STATE OF THE ART

The determination of covariance matrices associated with a set of digital source is signals is used in numerous fields to analyse the properties of the source signals, in particular correlations between these signals. It is notably the case when processing digital signals requiring an assessment of linear models, for example for designing filters, image processing, in weather forecast, etc. . . . . It is also used in automation, notably when designing linear command laws obtained by techniques such as the so-called LQG technique (linear quadratic Gaussian) as well as in the field of finance, as a risk analysis tool.

Conventional covariance determination devices, generally integrated to a digital signal processor (DSP), are most often designed in avoid as much bias as possible on the variances and the covariances associated with a set of digital signals. However, the current techniques do not provide with correct values for the spectrum of the covariance matrix, composed of the set of the proper values of the matrix. The bias on the spectrum of the covariance matrix may notably be high when the measurement samples of the signals to be analysed are low. The smallest proper values of the matrix are underestimated and the largest are overestimated. The conditioning of the matrix, i.e. the ratio of its largest proper value to its smallest proper value is, consequently, erroneous.

Still, when the matrix is used as an input of a digital processing device of the signal, bad conditioning often results in unstable outputs of the processing device thereby disturbing the source signals.

OBJECT OF THE INVENTION

The purpose of the invention is to provide a processing device comprising a covariance matrix correction device enabling to improve the conditioning of the matrix and to define a stable correction as regards small disturbances of the source signals, in order to reduce the difference between an a priori assessment and an a posteriori assessment of variances and of covariances.

According to the invention, this target is met in that the correction device comprises means for decomposition into total proper elements, according to the Kato spectral decomposition method, providing the total proper values of the covariance matrix to be corrected and of the first coefficient vectors, for the combination of the source signals, whereby the correction device comprises correction means using the total proper values and the first coefficient vectors in order to determine the corrected matrix.

According to a development of the invention, the correction device comprises means for determining, by a user, second coefficient vectors for the combination of the source signals.

According to a preferred embodiment, the correction means comprise means for assessing combination variances of the source signals using the first and/or the second coefficient vectors.

According to another characteristic of the invention, the correction device comprises means for searching for the corrected matrix closest to the matrix to be corrected, in relation to the variances supplied by the assessment means and total projectors provided by the means for decomposition into total proper elements.

The searching means apply, preferably, a quasi-Newton type method to the dual of a semi-defined least error square programme

BRIEF DESCRIPTION OF THE DRAWINGS

Other advantages and characteristics will appear more clearly using the following description of particular embodiments of the invention given for non limiting exemplification purposes, and represented on the appended drawings, wherein.

DESCRIPTION OF PARTICULAR EMBODIMENTS

Figure 1:
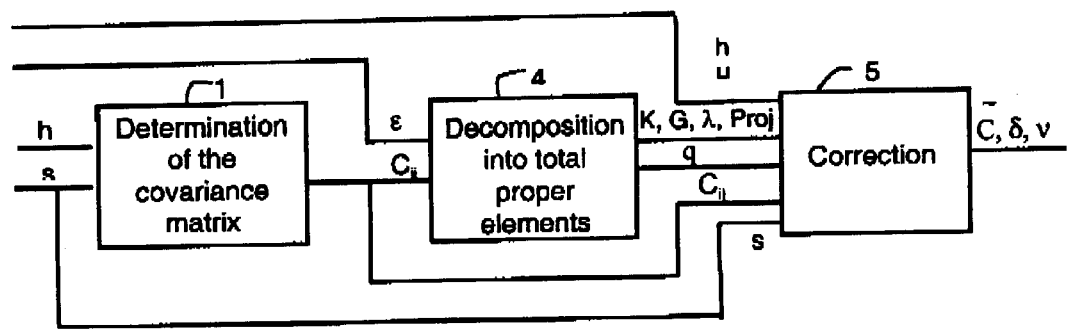
FIG. 1 illustrates, as a block diagram, a device for determining and correcting the covariance matrix of N source signals.

The device according to FIG. 1 comprises a block 1 for determining the covariance matrix C of N digital source signals $s_1$ to $s_N$. For i=1, . . . ,N, each signal $s_i$, composed of m samples $s_i^1$ to $s_i^m$, can be represented in the form of a vector:

$$s_i = \begin{bmatrix} s_i^1 \\ \vdots \\ s_i^t \\ \vdots \\ s_i^m \end{bmatrix} \text{ with a time discretion index } t = 1, \ldots, m$$

All the samples of all the source signals are applied simultaneously to the input of the block 1, which has therefore a sampled history of all the source signals.

Figure 2:
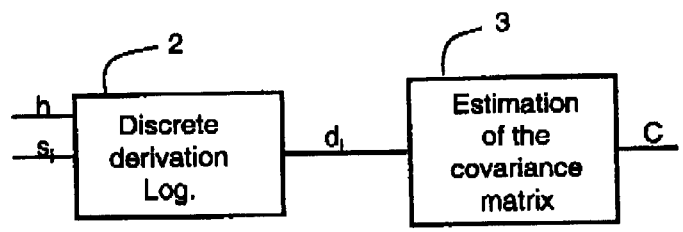
FIG. 2 represents a particular embodiment, according to the previous art, of the first block of the device according to FIG. 1.

The block 1 for determining the covariance matrix can be made of any known material. A particular embodiment of the block 1, represented on FIG. 2, comprises a block 2 of log-derivation and an estimator 3 of the covariance matrix. The block 2 is a standard block, of known type, receiving at input the N source signals and a time pitch h, entirely predetermined such that $1 \leq h \leq m$. The block 2 forms N log-derived signals $d_i$, or relative growth signals, N source signals $s_i$. The signals derived are real vectors, of size p=m−h, whereby each signal derived $d_i$ can be represented in the form:

$$d_i = \begin{bmatrix} d_i^1 \\ \vdots \\ d_i^t \\ \vdots \\ d_i^p \end{bmatrix} \text{ with } i = 1, \ldots, N$$

The signal $d_i$ is given by the equation.

$$d_i^t = \frac{s_i^{t+h} - s_i^t}{s_i^t} \text{ for } i = 1, \ldots, N \text{ and } t = 1, \ldots, p.$$

Moreover, for $s_i=0$, then $d_i=0$. The derivative function is then extended to zero signals.

The estimator 3 of the covariance matrix is also a standard block, of known type. It receives at input the N signals $d_i$, of size p=m−h, and outputs an estimated covariance matrix C, composed of a table of size N×N of symmetrical real numbers $C_{ij}$:

|      | $s_1$    | $s_i$    | $s_j$    | $s_N$    |
|------|----------|----------|----------|----------|
| $s_1$ | $C_{11}$ | $C_{i1}$ | $C_{j1}$ | $C_{N1}$ |
| $s_i$ | $C_{1i}$ | $C_{ii}$ | $C_{ji}$ | $C_{Ni}$ |
| $s_j$ | $C_{1j}$ | $C_{ij}$ | $C_{jj}$ | $C_{Nj}$ |
| $s_N$ | $C_{1N}$ | $C_{iN}$ | $C_{jN}$ | $C_{NN}$ |

Each quantity $C_{ij}$ supplied by the estimator 3, which can be of the so-called <<bias-free empirical>> type, is given by the equation $$C_{ij} = \frac{1}{p-1} \sum_{t=1}^{p} \left(d_i^t - \bar{d}_i^t\right)\left(d_j^t - \bar{d}_j^t\right),$$

with $1 \leq i,j \leq N$ and wherein the values $\bar{d}_i$ are the empirical averages of the log-derivative signals $d_i$, according to the equation:

$$\bar{d}_i = \frac{1}{p} \sum_{i=1}^{t} d_i^t$$

The correction device comprises a block 4 for decomposition into total proper elements, which receives at input the matrix C, supplied by the block 1 or by any other appropriate means, and a stability parameter $\epsilon$, a positive real number. The block 4 uses the Kato spectral decomposition method (T. Kato: <<Perturbation Theory for Linear Operators>>, Springer-Verlag, 1980). The block 4 calculates N real proper values $\lambda_1$ à $\lambda_N$ of the matrix C as well as N associated proper vectors $q_1$ à $q_N$. The proper values are such that:

$$\lambda_1 \geq \lambda_2 \geq \ldots \lambda_N$$

It also forms K sets of indices defining $\epsilon$-groups noted $G_1$ to $G_K$. For j=1, . . . , N−1, $\lambda_j$ and $\lambda_{j+1}$ belong to the same group if $\lambda_j - \lambda_{j+1} \leq \epsilon$. If this inequality is not respected, then a new group is formed. In each group $G_j$, an index $f_j$ designates the first index of the group and an index $I_j$ designates the last index of the group: $G_j = \{f_j, \ldots, I_j\}$ for j=1, . . . , K with $f_1$=1 and $I_K$=N.

The block 4 derives therefrom K total proper values $\hat{\lambda}_j$ such that:

$$\hat{\lambda}_j = \frac{1}{I_j + 1 - f_j} \sum_{r=f_j}^{I_j} \lambda_r \text{ with } j = 1, \ldots, K$$

The block 4 also calculates K total projections $\text{Proj}_j$, which are matrices N×N, such that:

$$\text{Proj}_j = \sum_{r=f_j}^{I_j} q_r q_r^T \text{ where } q_r^T \text{ is the transposed of } q_r.$$

The block 4 outputs, at a correction block 5 (FIG. 1), the N proper vectors $q_1$ to $q_N$, the number K, the K sets of indices defining the $\epsilon$-groups, the K total proper values $\hat{\lambda}_j$ and the K total projections $\text{Proj}_j$.

The use of the Kato method guarantees the stability of the correction for disturbed source signals.

Figure 3:
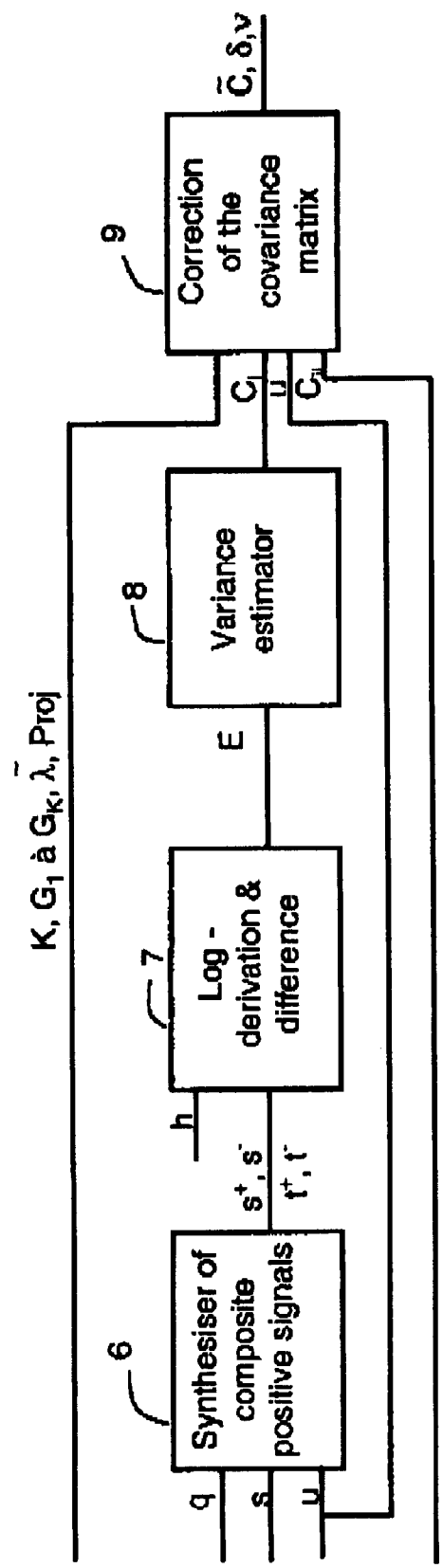
FIG. 3 represents a particular embodiment of the third block of the device according to FIG. 1.

As represented on FIG. 3, the correction block 5 comprises a composite positive signal synthesiser 6, a log-derivation and difference determination block 7, a variance estimator 8 and a block 9 for correction of the covariance matrix.

The composite positive signal synthesiser 6 receives at input the N source signals $s_1$ to $s_N$, of size m, the N proper vectors $q_1$ to $q_N$, as well as P real vectors $u_1$ à $u_p$, which are user-defined. the N+P vectors q and u ($q_1$ to $q_N$ and $u_1$ to $u_p$) are weighing coefficient vectors of the source signals. The synthesiser 6 decomposes first of all, according to a Moreau decomposition, the coefficient vectors q and u into positive and negative portions, such that;

$$q_i = q_i^+ - q_i^- \text{ with } q_i^+ \perp q_i^- \text{ and } i=1, \ldots, N$$

$$u_j = u_j^+ - u_j^-; \text{ with } u_j^+ \perp u_j^- \text{ and } j=1, \ldots, P$$

The vectors= $q_i^+$, $q_i^-$, $u_j^+$ and $u_j^-$ are positive vectors, from which the synthesiser 6 forms fur families of composite positive signals $s^+$, $s^-$, $t^+$ and $t^-$ such that:

$$s_i^+ = \sum_{l=1}^{N} [q_i^+]_l s_1$$

$$s_i^- = \sum_{l=1}^{N} [q_i^-]_l s_1 \text{ with } i = 1, \ldots, N$$

$$t_j^+ = \sum_{l=1}^{N} [u_j^+]_l s_1$$

$$t_j^- = \sum_{l=1}^{N} [u_j^-]_l s_1 \text{ with } j = 1, \ldots, P$$

The 2(N+P) composite positive signals thus obtained are real vectors, of size m. They are applied to the input of the block 7 which performs a standard log-derivation operation, then carries difference operations between certain derivative signals. The derivation operation is of the same type as that carried out by the block 2. It uses the same time pitch, integer, h ($1 \leq h \leq m$) and supplies the derivative signals $ds_i^+$, $ds_i^-$, $dt_i^+$ and $dt_i^-$, of length m−h, such that:

$$[ds_i^+]^t = \frac{[s_i^+]^{t+h} - [s_i^+]^t}{[s_i^+]^t} \text{ and } [ds_i^-]^t = \frac{[s_i^-]^{t+h} - [s_i^-]^t}{[s_i^-]^t}$$

-continued $$[dt_i^+]^t = \frac{[t_i^+]^{t+h} - [t_i^+]^t}{[t_i^+]^t} \text{ and } [dt_i^-]^t = \frac{[t_i^-]^{t+h} - [t_i^-]^t}{[t_i^-]^t}$$

Moreover, as in the block 2, the derivation function is extended to zero signals, whereas the derivative of a zero signal is equal to zero.

The block 7 forms then N+P signals E differences of derivatives, of size p=m-h, such that:

$E_i ds_i^+ - ds_i^-$, for i=1, ..., N and $E_i = dt_i^+ - dt_i^-$, for i=N+1, ... N+P, Each signal $E_i$ is a real vector which can be represented in the form;

$$E_i = \begin{bmatrix} E_i^1 \\ \vdots \\ E_i^t \\ \vdots \\ E_i^p \end{bmatrix} \text{ for } i = 1, \ldots, (N+P).$$

The signals E are applied to the input of the variance estimator 8, of the bias-free empirical type, which calculates, conventionally, the variances associated with its input signals. It thus supplies (N+P) vectors $C_i$ representative of these variances, according to the equation:

$$C_i = \frac{1}{p-1} \sum_{i=t}^{P} (E_i^t - \overline{E_i^t})^2 \text{ with } 1 \leq i \leq N$$

The values $\overline{E_i}$ are the empirical averages of the signals $E_i$, according to the equation:

$$\overline{E_i} = \frac{1}{p} \sum_{i=1}^{t} E_i^t$$

The block 9 receives at input the covariance matrix C to be corrected, formed by a symmetrical real matrix, of size N×N, of quantities $C_{ij}$, the (N+P) vectors $C_l$ reconstructed supplied by the variance estimator 8, the integer K, the K sets of indices $G_j = \{f_j, \ldots, l_j\}$ for j=1, ..., K with $f_1=1$ and $l_K=N$, the K total proper values $\lambda_j$ and the K total projections $Proj_j$, which are supplied thereto by the block 4, as well as the P real vectors u.

The block 9 first calculates K total proper values corrected $\tilde{\lambda}_j$ such that:

$$\tilde{\lambda}_j = \frac{1}{l_j + 1 - f_j} \sum_{r=f_j}^{l_j} C_r \text{ with } j = 1, \ldots, K$$

It then searches for the matrix X closest to the matrix C to be corrected satisfying to the following K+P linear stresses:

$<Proj_j, X> = \tilde{\lambda}_j$ with j=1, ..., K $<u_i u_i^T, X> = C_l$ with i=1, ..., P The scalar product $<X,Y>$ between 2 symmetrical matrices X and Y is defined by the trace, i.e. by the sum of the diagonal elements of the product of the 2 matrices, The matrix X must also be a semi-defined symmetrical matrix (X≧0).

Thus, the total spectral measurements reconstructed represented by the variance vectors $C_i$, are integrated to the linear stresses.

The search is realised by the block 9 by a quasi-Newton type method on the dual of a semi-defined least error square programme (min $\|X-C\|^2$). In a particular embodiment, the block 9 uses for searching for the matrix X a method known as BFGS type method. Such a method is notably described in <<Optimisation Numdrique>>, Bonnans and al., volume 27 of <<Mathématiques & Applications>>, Springer-Verlag, 1997.

The block 9 outputs a covariance matrix corrected $\tilde{C}=X$, of size N×N. as well as K values δ, corresponding to the fundamental variance deviations before and after correction, and K+P dual parameters of sensibility v, composed of real numbers and associated with the K+P linear stresses. The fundamental variance deviations δ are given by:

$\delta_i = \lambda_i - \tilde{\lambda}_i$, with i=1, ..., K.

Performing the calculations in the dual space enables to obtain the required result more rapidly and, consequently, to reduce the cost of the correction device.

What is claimed is:

1. A processing device for a plurality of source digital signals, composed of measurement samples of the signals to be analysed, comprising a correction device for a covariance matrix, representative of the relations between the source signals, whereas the correction device comprises means for decomposing into total proper elements, according to the Kato spectral decomposition method, supplying the total proper values of the covariance matrix to be corrected and of the first coefficient vectors for the combination of the source signals, whereby the correction device comprises means of correction using the total proper values and the first coefficient vectors in order to determine the corrected matrix.

2. A device according to claim 1, wherein the correction device comprises user-defined means of determination of second coefficient vectors for the combination of the source signals.

3. A device according to claim 1, wherein the correction means comprises means for assessing combination variances of the source signals using the first and/or the second coefficient vectors.

4. A device according to claim 3, wherein the correction device comprises searching means for the corrected matrix closest to the matrix to be corrected, in relation to the variances supplied by the assessment means and to total projectors supplied by the means of decomposition into total proper elements.

5. A device according to claim 4, wherein the searching means apply a quasi-Newton type method on the dual of a semi-defined least error square programme.

6. A device according to claim 5, wherein the searching means apply a BFGS type method.

7. A device according to claim 3, wherein the assessment means of the variances comprise means for decomposing coefficient vectors into positive and negative portions.

* * * * *